United States Patent [19]
Mikami

[11] Patent Number: 5,899,588
[45] Date of Patent: May 4, 1999

[54] SHUTTER DEVICE OF A CAMERA

[75] Inventor: Yuji Mikami, Kanagawa, Japan

[73] Assignee: Fuji Photo Film Co., Ltd., Kanagawa, Japan

[21] Appl. No.: 09/024,305

[22] Filed: Feb. 17, 1998

[30] Foreign Application Priority Data

Feb. 19, 1997 [JP] Japan .................................. 9-035169

[51] Int. Cl.$^6$ ................................ G03B 9/08; G03B 9/70
[52] U.S. Cl. ........................................... 396/195; 396/493
[58] Field of Search .................................. 396/493, 180, 396/195, 495

[56] References Cited

U.S. PATENT DOCUMENTS 5,381,200  1/1995  Takagi et al. ........................... 396/493
5,630,176  5/1997  Yamashina et al. ................. 396/493 X
5,721,985  2/1998  Smith ....................................... 396/195

Primary Examiner—W. B. Perkey
Attorney, Agent, or Firm—Young & Thompson

[57] ABSTRACT

A shutter blade is rotatably attached between a base member and a cover member which constitute an exposure unit. An engaging shaft of the shutter blade emerges from a hole formed in the cover member. The cover member is integrally formed with a covering part for covering a gap formed between the base member and the cover member. A key projects on a surface of the engaging shaft emerging from the hole of the cover member. A kicked member is fixed to the key. The kicked member is kicked by a kicking lever in association with a shutter release operation. Thus, the shutter blade is integrally rotated with the kicked member. The covering part covers the gap in which the shutter blade is disposed so that fine sand or the like is prevented from entering the gap.

10 Claims, 4 Drawing Sheets

SHUTTER DEVICE OF A CAMERA

BACKGROUND OF THE INVENTION

1. Field of the Invention

The present invention relates to a shutter device of a camera including a lens-fitted film unit and so forth.

2. Description of the Related Art

As a lens-fitted film unit in which a new film cartridge is loaded at the time of manufacture thereof, there are "Quick Snap Super Slim (trade name)" and so forth. they are manufactured and sold by the assignee of the present application. In such a lens-fitted film unit, troublesome operation of film loading and film rewinding is unnecessary.

The lens-fitted film unit has a film roll chamber and a cartridge chamber. In the film roll chamber, a film is contained in a roll state. In the cartridge chamber, a cartridge taking up the exposed film is contained. Between the film roll chamber and the cartridge chamber, a light shielding member is provided. An exposure unit comprising a shutter device and a film stopping device is attached to the light shielding member.

The shutter device is constituted of a lens holder, a shutter blade and a base member. A taking lens is attached to the lens holder. The shutter blade is rotatable between a close position where a photographic optical path is shut off and an open position where the optical path is not shut off. The base member supports the shutter blade between itself and the lens holder. The shutter blade is integrally formed with a kicked member. The kicked member protrudes from an upper gap formed between the lens holder and the base member. The kicked member is kicked by a shutter driving lever in association with a shutter release operation so that the shutter blade is rotated.

In order to decrease the cost of the lens-fitted film unit, a shutter button thereof is formed by cutting an upper portion of a front cover. Thus, fine sand, dust and the like sometimes enter its unit body from the cut portion of the front cover. Although the lens holder entirely covers a front side of the base member, the fine sand or the like enters a space formed between the base member and the lens holder through the upper gap from which the kicked member protrudes. Accordingly, there arises a problem in that a rotational movement of the shutter blade becomes bad before the lens-fitted film unit is used up. Further, there arises another problem in that the sand or the like enters the light shielding member from a shutter opening and injures a photographic film.

SUMMARY OF THE INVENTION

In view of the foregoing, it is a primary object of the present invention to provide a shutter device of a camera in which invasion of fine sand, dust and the like is prevented.

It is a second object of the present invention to provide a shutter device of a camera in which a movement of a shutter blade is prevented from becoming bad due to fine sand, dust and the like.

It is a third object of the present invention to provide a shutter device of a camera in which a photographic film is not injured by fine sand, dust and the like.

In order to achieve the above and other objects, the shutter device of the camera comprises a covering part for covering a gap formed between a base member and a cover member which constitute an exposure unit of a lens-fitted film unit.

In a preferred embodiment, the covering part is integrally formed with the cover member. However, the covering part may be integrally formed with the base member.

The cover member is provided with a hole for bearing a shaft of a shutter blade. The shaft of the shutter blade is inserted into the hole of the cover member. On a surface of the shaft emerging from the hole, another shaft integrally formed with a key projects toward a front side. A kicked member is fixed to the key-formed shaft so that the shutter blade is integrally rotated with the kicked member. The kicked member is kicked by a kicking lever in association with a shutter release operation.

On the other hand, the base member is provided with a pin to which a cavity of the shaft of the shutter blade is attached so as to rotate around the pin. Accordingly, the shutter blade is rotatably attached between the base member and the cover member of the exposure unit. In other words, the shutter blade is rotatably attached in the gap formed between the base member and the cover member.

In the present embodiment, the covering part of the cover member is adapted to cover the gap. Thus, if fine sand or the like enters the lens-fitted film unit through a cut portion formed in a front cover thereof, the fine sand or the like is prevented from entering the gap formed between the base member and the cover member. Therefore, a rotational movement of the shutter blade is not disturbed by the fine sand or the like.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 4:
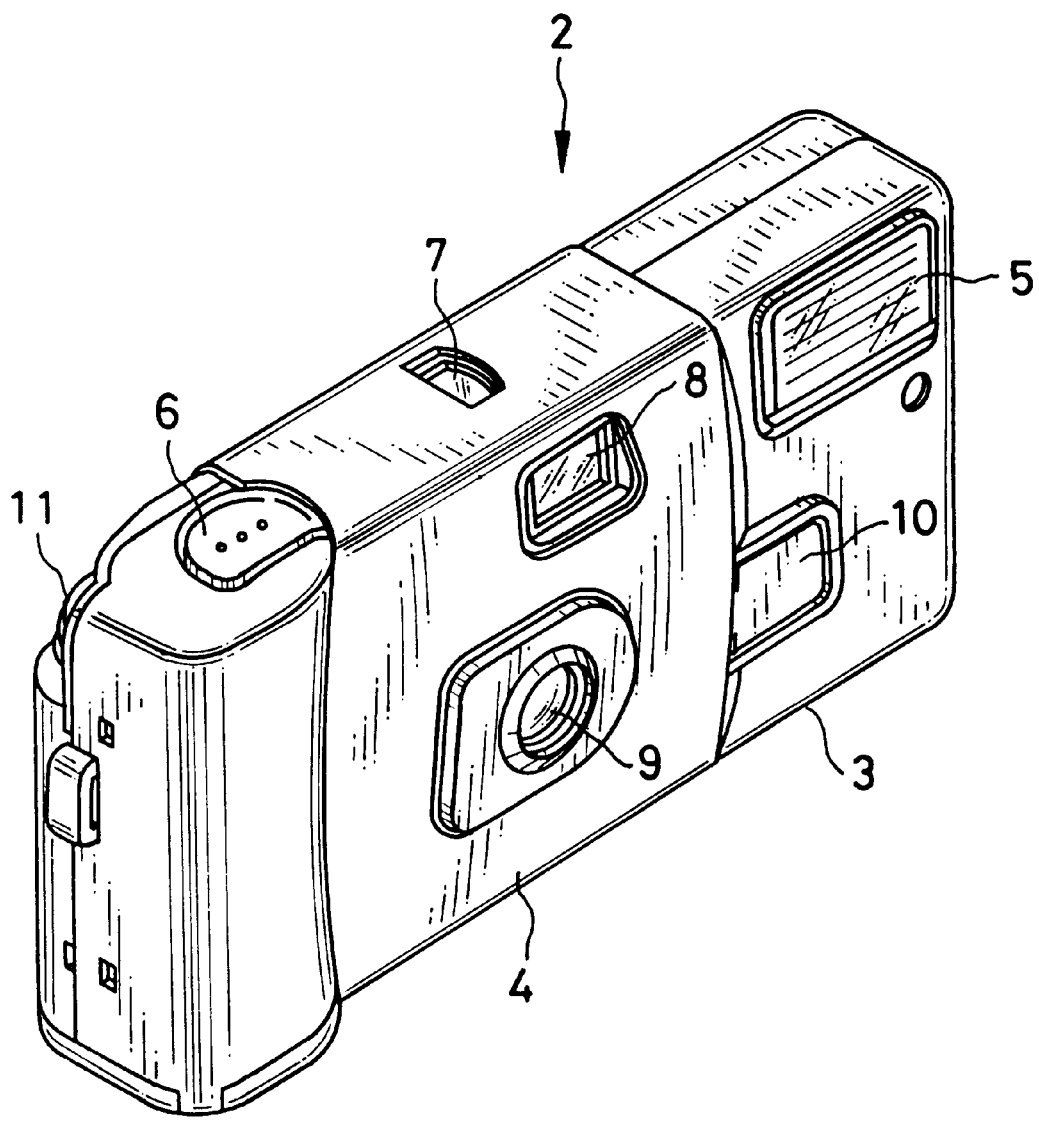
FIG. 4 is a perspective view showing an appearance of the lens-fitted film unit.

Hereinafter, a preferred embodiment according to the present invention is described. As shown in FIG. 4, a lens-fitted film unit 2 is constituted of a unit body 3 and a label 4. A film cartridge is loaded into the unit body 3 beforehand and various photographing mechanisms are attached to the unit body 3. The label 4 covers the unit body 3 partially. The unit body 3 is provided with a release button 6 and a counter displaying window 7 which are arranged on an upper face thereof. At a front face of the unit body 3, a flash lamp 5, a view finder 8, a taking lens 9, a flash charging switch 10 and so forth are provided. Further, a winding knob 11 operated every photographing of one frame emerges from a rear side of the unit body 3.

Figure 3:
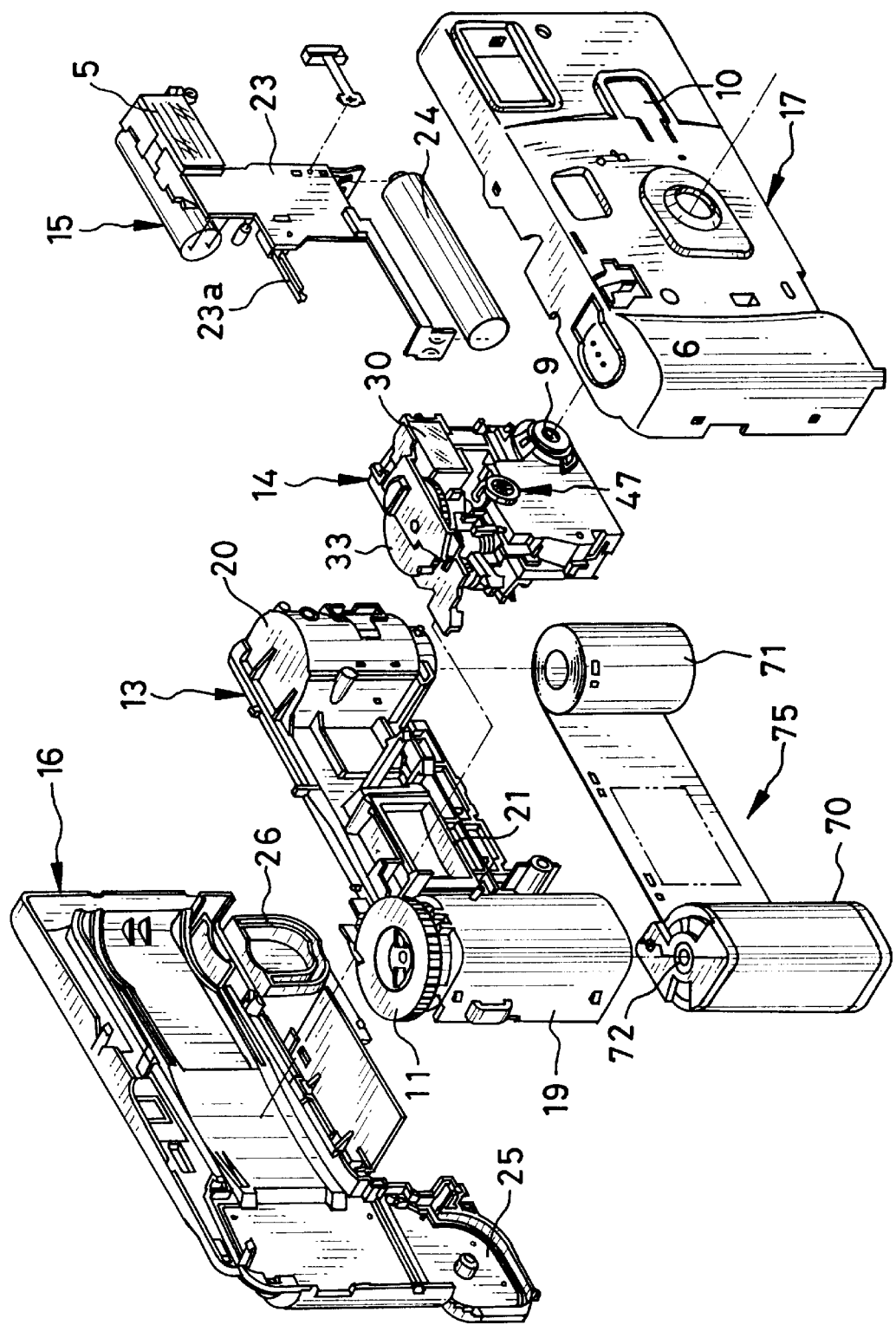
FIG. 3 is an exploded perspective view of a lens-fitted film unit.

In FIG. 3 showing an exploded perspective view of the unit body 3, a main unit 13 is integrally formed with a light shielding member 21 for shielding a photographic optical path 37 between the taking lens 9 and a film 71. At both sides of the light shielding member 21, a cartridge chamber 19 and a film roll chamber 20 are provided. The cartridge chamber 19 contains a cartridge 70 and the film roll chamber 20 contains the film 71 drawn out from the cartridge 70 in a roll state. The winding knob 11 is rotatably attached to an upper portion of the cartridge chamber 19. A shaft of the winding knob 11 engages with a spool 72 of the cartridge 70.

An exposure unit 14 comprises the taking lens 9, a shutter mechanism, a film winding mechanism and so forth. The exposure unit 14 is removably attached to a front side of the light shielding member 21. A flash circuit including a synchro switch 23a is formed on a circuit board 23 which constitutes a flash unit 15. The synchro switch 23a comprises two metal plates. The flash lamp 5, a battery 24 for power supply and so forth are attached to the circuit board 23. The circuit board 23 is disposed on the film roll chamber 20 side of the front face of the main unit 13.

A front cover 17 is attached to the main unit 13 so as to cover the front side thereof. On an upper face and a front face of the front cover 17, the release button 6 and the flash charging switch 10 are respectively formed by cutting a surface of the front cover 17. A rear cover 16 is attached to the rear side of the main unit 13 so as to cover the cartridge chamber 19 and the film roll chamber 20. Bottom openings of the cartridge chamber 19 and the film roll chamber 20 are respectively covered with bottom lids 25 and 26 which are integrally formed with the rear cover 16.

Figure 1:
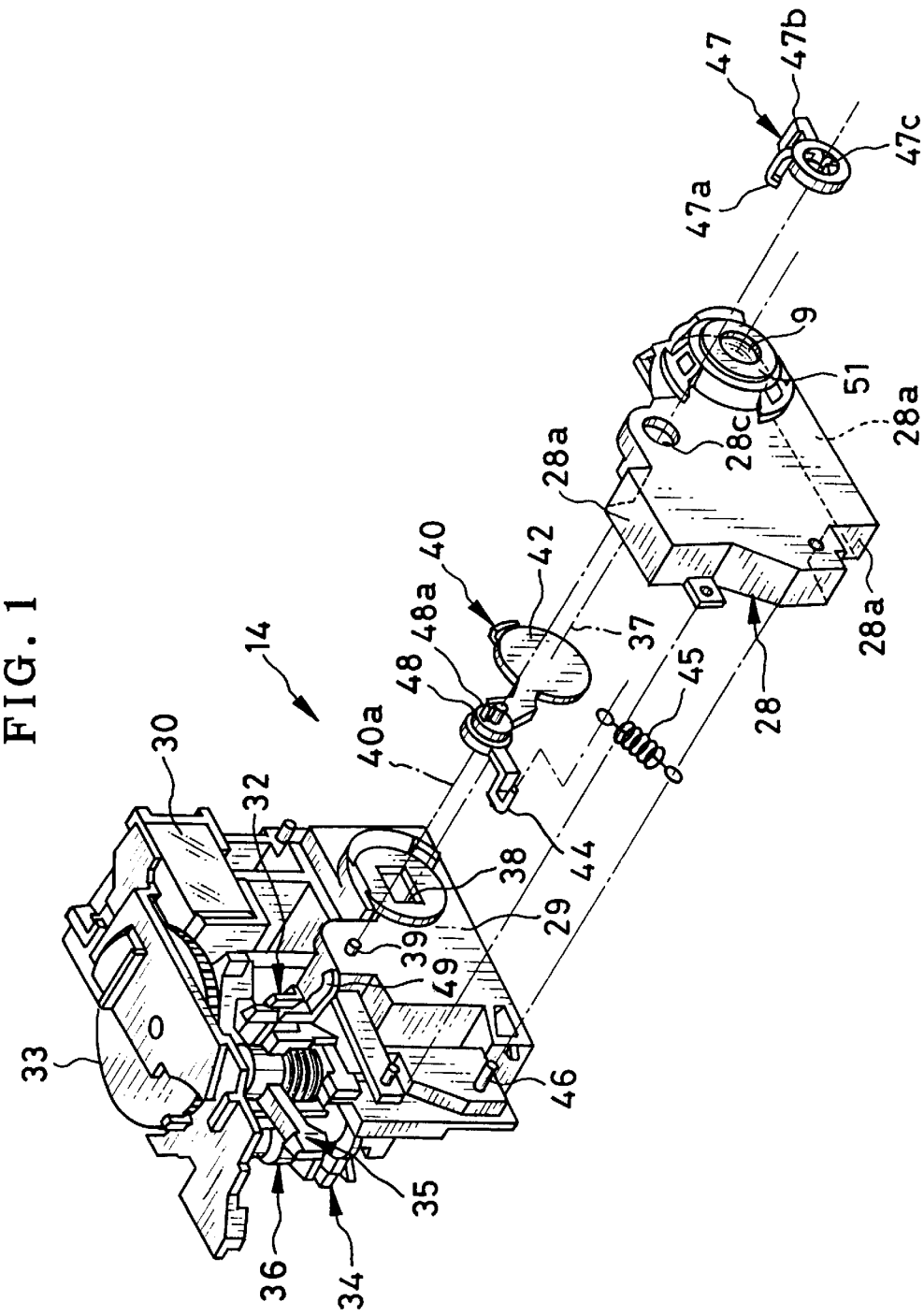
FIG. 1 is an exploded perspective view of an exposure unit according to the present invention.

The exposure unit 14 is composed as a single unit. As shown in FIG. 1, in the exposure unit 14, a plurality of parts described later are attached to a base member 29 which is made of plastic. The exposure unit 14 is provided with a finder device comprising an objective lens 30 besides a shutter charging mechanism, a shutter driving mechanism, a counter mechanism and a film stopping mechanism. FIG. 1 shows a state that the exposure unit 13 is exploded to the base member 29, a shutter blade 40, a coiled spring 45, a cover member 28 and a kicked member 47.

A shutter driving lever 32, a counter disc 33, a retaining lever 35 and a cam 36 are rotatably attached to each of shafts provided on the upper portion of the base member 29. A sprocket 34 engages with a lower portion of the cam 36 at the rear side of the base member 29. The sprocket 34 is adapted to mesh with a perforation of the film 71 and rotated when a frame of the film 71 is wound up into the cartridge 70. At this time, the cam 36 makes half a rotation in a counterclockwise direction in FIG. 1 to rotate the counter disc 33 by one scale in a clockwise direction.

The shutter driving lever 32 and the retaining lever 35 are urged by individual springs in a counterclockwise direction and in a clockwise direction respectively in FIG. 1. The shutter driving lever 32 is rotated by the cam 36 in the clockwise direction against the urging of the spring. In other words, the shutter driving lever 32 is rotated toward a charging position against the spring. When the cam 36 rotates, the retaining lever 35 is slightly rotated in the clockwise direction and engages with the shutter driving lever 32 to retain it at the charging position. At this time, the retaining lever 35 engages with the cam 36 and the winding knob 11 to prevent the rotation thereof so that the film winding is inhibited. Upon depressing the release button 6, a lever integrally formed with the release button 6 rotates the retaining lever 35 against urging of the spring in the counterclockwise direction in FIG. 1. Thus, the shutter driving lever 32 is released from being retained at the charging position so that the shutter driving lever 32 is rotated by means of the spring in the counterclockwise direction.

The cover member 28 is attached so as to cover the front face of the base member 29. A shutter opening 38 is formed in the base member 29. At a diagonal above portion of the shutter opening 38, a pin 39 projects along the photographic optical path 37. The shutter blade 40 comprises an engaging shaft 48 and a shutting portion 42. A cavity of the engaging shaft 48 is attached to the pin 39 so as to rotate around a central axis 40a of the engaging shaft 48. In other words, the engaging shaft 48 is a rotary shaft of the shutter blade 40. The shutting portion 42 is for opening and closing the shutter opening 38.

Figure 2:
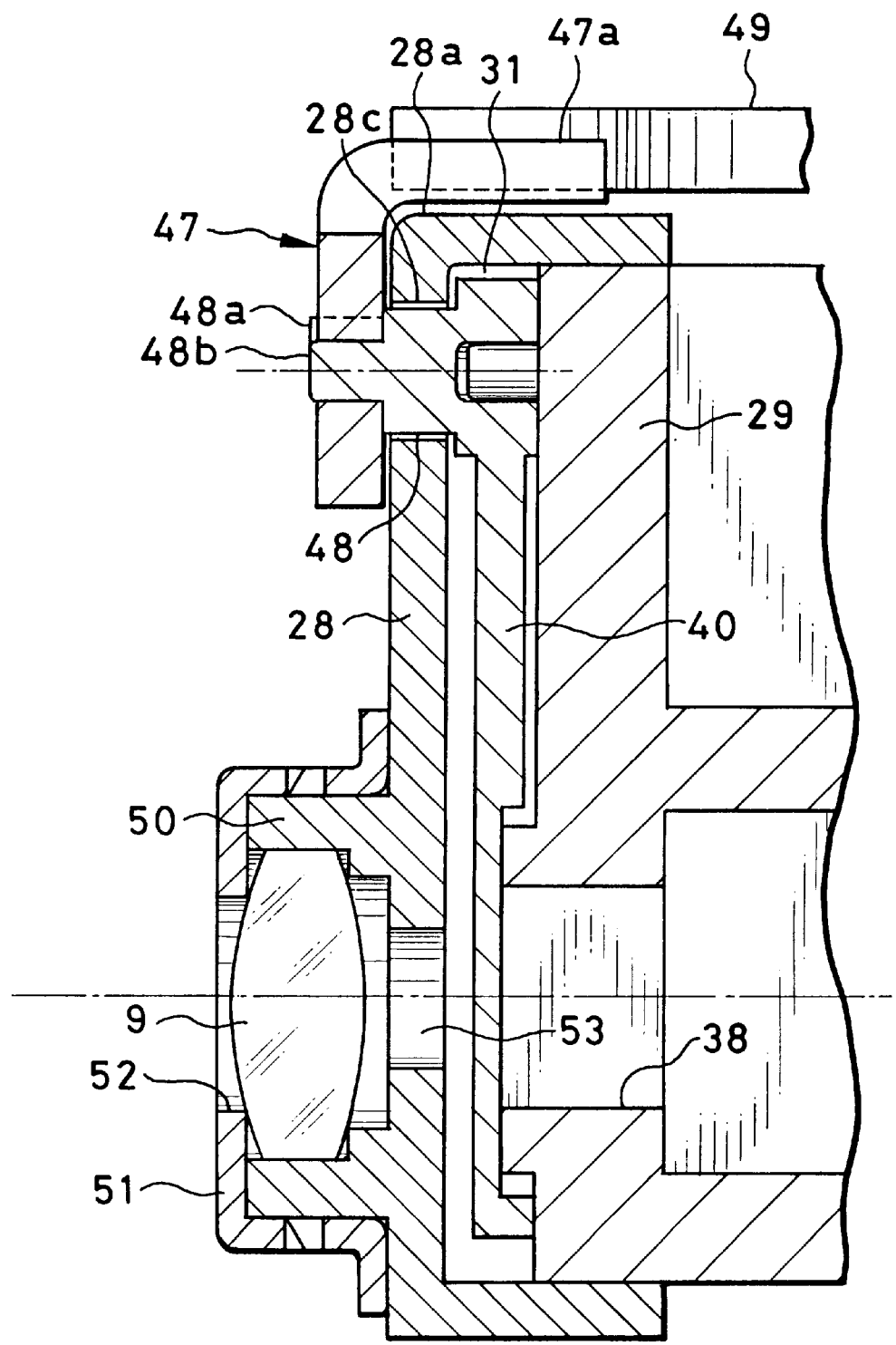
FIG. 2 is a partially sectional view of the exposure unit.

The cover member 28 holds the taking lens 9 and is provided with a hole 28c for baring the engaging shaft 48. The hole 28c is formed at a diagonal above portion of the taking lens 9. As shown in FIG. 2, the engaging shaft 48 of the shutter blade 40 is inserted into the hole 28c and the shutter blade 40 is rotatably attached between the cover member 28 and the base member 29. The hole 28c is a bearing hole for bearing an outer periphery of the engaging shaft 48.

Moreover, the cover member 28 has a lens barrel 50 in which the taking lens 9 is disposed. The lens barrel 50 is formed so as to surround the shutter opening 38 of the base member 29. A lens holder 51 is attached to the front of the lens barrel 50. The lens holder 51 has an opening 52 from which the taking lens is exposed. Behind the taking lens 9, an open area 53 is formed in the cover member 28. The open area 53 of the cover member 28 faces the shutter opening 38 via the shutter blade 40.

The cover member 28 is integrally formed with a covering part 28a for covering a gap 31 formed between the cover member 28 and the base member 29. The covering part 28a is formed so as to surround the gap 31 so that dust and the like are prevented from entering the gap 31. In this embodiment, the covering part 28a is formed on a peripheral edge of the cover member 28.

The shutter blade 40 is covered with the covering part 28a between the cover member 28 and the base member 29. The kicked member 47 is for rotating this shutter blade 40 from outside of the cover member 28. In this embodiment, a key groove 47c is provided at a hollow of the kicked member 47. On the other hand, at a top of the engaging shaft 48, another shaft 48b is provided as shown in FIG. 2. The shaft 48b has a key 48a integrally formed therewith. The key groove 47c provided in the kicked member 47 is fixed to the key 48a projecting on the shaft 48b of the engaging shaft 48 which emerges from the hole 28c. Accordingly, the kicked member 47 is adapted to integrally rotate with the shutter blade 40.

The coil spring 45 is made of metal. One end of this coiled spring 45 catches on a pin 44 integrally formed with the engaging shaft 48 at a side thereof. The other end of the coiled spring 45 catches on a pin 46 projecting on the front face of the base member 29. The shutter blade 40 is urged in the direction for closing the shutter opening 38, namely, in the counterclockwise direction in FIG. 1.

When retention of the shutter driving lever 32 is released in association with the shutter release operation and the shutter driving lever 32 rotates in the counterclockwise direction in FIG. 1, a projection 47a integrally formed with the kicked member 47 is kicked by a kicking lever 49 which is integrally formed with the shutter driving lever 32. Thus, the kicked member 47 is rotated in the clockwise direction. Further, the shutter blade 40 rotates together with the kicked member 47 in the clockwise direction against urging of the coiled spring 45. Accordingly, the shutter opening 38 is opened.

By rotation of the shutter blade 40, a projection 47b integrally formed with the kicked member 47 comes into contact with the synchro switch 23a of the circuit board 23 to short-circuit the metal plates constituting the synchro switch 23a. At this time, flashlight is emitted from the flash lamp 5 on condition that the flash charging switch 10 is pressed and the charging of the flash unit 15 has completed.

The shutter blade 40 rotated by means of the kicking lever 49 in the clockwise direction is rotated by urging of the coiled spring 45 in the counterclockwise direction again. Accordingly, the shutter opening 38 is closed.

In the above-described exposure unit 14, the gap 31 formed between the cover member 28 and the base member 29 is covered with the covering part 28a so as to be surrounded. Accordingly, if fine sand enters the lens-fitted film unit 2 from the cut portion provided in the front cover 17 to form the release button 6, the flash charging switch 10 and so forth, it is possible to prevent the fine sand from entering the shutter device. Thus, when the lens-fitted film unit is used at sandy beach or the like, it is prevented that the rotational movement of the shutter blade 40 is disturbed by the sand. Further, it is also prevented that the sand enters the light shielding member 21 through the shutter opening 38 and adheres to a film 75.

In the above-mentioned embodiment, the engaging shaft of the shutter blade is bared from the hole formed in the cover member and the kicked member is fixed to the key projecting on the surface of the engaging shaft. However, this is not exclusive. The kicked member may be fixed to a part of the shutter blade including a central axis of the shutter blade emerging through the foregoing hole. For example, the kicked member may be provided with an engaging shaft and fixed to a part of the shutter blade including the central axis of the shutter blade emerging from the hole.

Moreover, the taking lens is attached to the cover member. However, it is possible that the taking lens is attached to another component, and this component is attached to the cover member or the base member. The covering part is integrally formed with the cover member, but the covering part may be integrally formed with the base member or both of the cover member and the base member. The covering part is formed so as to surround the gap, however, this is not exclusive. The covering part may cover at least the top of the gap.

Moreover, the shutter device described above may be composed as a single unit and removably attached to the front of the light shielding member. Further, the cover member and the base member may be formed as a single molded article. Furthermore, a base component of the exposure unit may be composed as another component with the cover member and the base member. This base component is attached to the cover member or the base member.

As to the above embodiment, the present invention is applied to the shutter device of the lens-fitted film unit. However, the present invention is available to the shutter device of a general camera besides the lens-fitted film unit.

As described above, in the shutter device according to the present invention, the covering part is provided on the cover member or the base member. The covering part is adapted to cover at least the top of the gap formed between the base member and the cover member. Moreover, the cover member is formed with the hole for baring a part of the shutter blade including its central axis. The kicked member is fixed to the part of the shutter blade emerging through the hole. Accordingly, it becomes possible to cover the shutter device securely. Thus, the fine sand, the dust and the like are prevented from entering the shutter device. The shutter device according to the present invention is suitable for the camera including the lens-fitted film unit, which is used under the bad condition that there are many fine sand, dust and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A shutter device of a camera having a base member provided with a shutter opening for photographing, a shutter blade being rotatable on said base member for opening and closing said shutter opening and a member for urging said shutter blade in a direction that said shutter opening is closed, said shutter blade being rotated against said urging member by means of a kicking lever interlocking with a shutter release operation to open said shutter opening, said shutter device comprising:

a cover member disposed so as to cover said shutter blade and a front of said base member, a gap being formed between said cover member and said base member such that said shutter blade is permitted to rotate;

a covering part for covering at least an upper portion of said gap, said covering part being provided on said base member or said cover member;

an open area formed in said cover member, said open area facing said shutter opening;

a hole formed in said cover member for fitting a rotary shaft of said shutter blade thereinto; and a kicked member fixed to a top of said rotary shaft projecting from said hole and disposed at an outside of said cover member, said kicked member integrally rotating with said shutter blade.

2. A shutter device of a camera according to claim 1, wherein said cover member has a lens barrel formed so as to surround said shutter opening and a taking lens is attached to said lens barrel.

3. A shutter device of a camera according to claim 1, wherein said covering part covers almost all around said gap.

4. A shutter device of a camera according to claim 3, wherein said covering part is formed on a peripheral edge of said cover member.

5. A shutter device of a camera according to claim 4, wherein said base member is provided with a pin fitted into a cavity of said shutter blade, said shutter blade being rotatably supported by said hole of said cover member and said pin.

6. A shutter device of a camera according to claim 5, wherein said top of said rotary shaft is a key-fixed shaft fitted into a hollow provided in said kicked member and having a key groove.

7. A shutter device of a camera according to claim 6, wherein said kicked member is provided with a first projection kicked by said kicking lever, said kicked member being integrally rotated with said shutter blade by kicking said first projection with said kicking lever.

8. A shutter device of a camera according to claim 7, wherein said urging member is a coiled spring.

9. A shutter device of a camera according to claim 8, wherein said kicked member is provided with a second projection for turning on a synchro switch activating a flash lamp attached to said base member.

10. A shutter device of a camera according to claim 9, wherein said synchro switch includes two metal plates, one of said metal plates being pushed by said second projection of said kicked member and contacting the other of said metal plates.

* * * * *